May 29, 1951 M. H. L. SÉDILLE 2,554,593
APPARATUS, INCLUDING GAS TURBINES FOR
THE DIRECT DRIVING OF VEHICLES
Filed Aug. 9, 1945 2 Sheets-Sheet 1
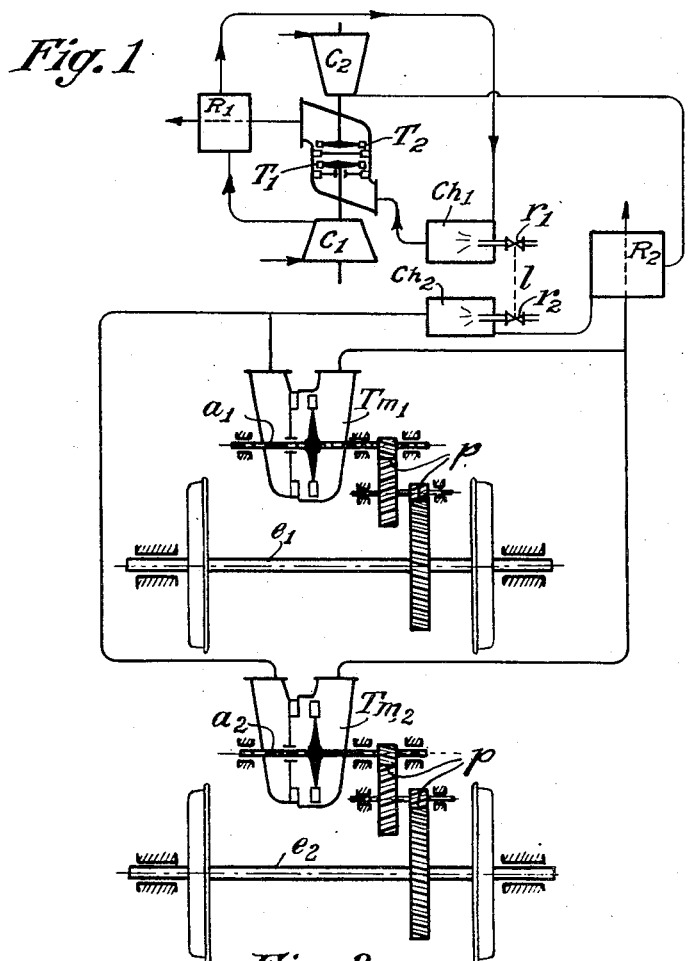
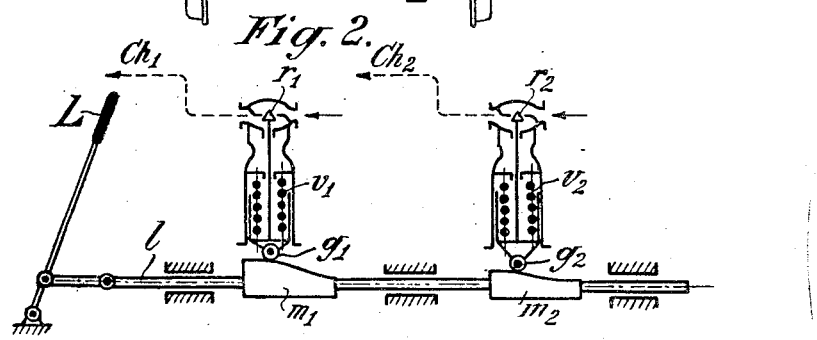
INVENTOR
M. H. L. Sédille
By Watson, Cole, Grindle
& Watson INVENTOR
M. H. L. Sédille
By Watson, Cole, Grindle
& Watson Patented May 29, 1951

2,554,593

UNITED STATES PATENT OFFICE 2,554,593

APPARATUS, INCLUDING GAS TURBINES FOR THE DIRECT DRIVING OF VEHICLES

Marcel Henri Louis Sédille, Paris, France, assignor to Societe Rateau (Societe Anonyme), Paris, France, a company of France Application August 9, 1945, Serial No. 609,869
In France August 8, 1941

3 Claims. (Cl. 60—41)

The driving of vehicles through a gas turbine is simple when an electric transmission is employed. However, a certain amount of energy is thereby lost, and it is preferable to provide a direct mechanical connection between the gas turbine and the vehicle wheels.

To employ a direct mechanical drive it is desirable that the axis of the driving turbine be arranged transversely with reference to the vehicle frame. However, the size of the driving system as a whole does not allow its mounting in such a transverse position and it is therefore necessary to use a double group comprising one or more driving turbines arranged transversely with reference to the frame, and an auxiliary group arranged longitudinally.

An apparent solution would be of course to couple the driving turbines and the auxiliary turbines in parallel. Such an arrangement would however lead of necessity, as proved by calculation, to an adjustment of the respective equivalent opening in each turbine in order to provide for partial loads a distribution of energy which would ensure the maximum efficiency of the group and avoid a pumping of the compressor. Such an adjustment leads to great complications.

The present invention leads to driving systems having a series of features which permit the maximum ease of adjustment together with an excellent efficiency for partial loads.

According to a first form of execution of the invention, the air compressor for the auxiliary group is distinct from the air compressor associated with the driving turbine, and the combustion chamber for the auxiliary and for the driving turbines are distinct from one another, means for controlling the admissions of fuel to these chambers are interconnected so that fuel is admitted to these chambers in a given ratio which depends on the characteristic features of the devices of the group.

According to a modification, the driving turbines are in series with the auxiliary turbines and the air compressor is subdivided into two bodies driven separately by the two distinct wheels of the auxiliary turbine, the adjustment being provided by acting solely on the introduction of fuel into the combustion chamber or chambers.

The following description given with reference to accompanying drawings is given by way of example and by no means in a restrictive sense.

Figure 1 illustrates diagrammatically an embodiment of the invention;

Figure 2 shows a detail of a control device applicable to this embodiment;

Figure 3:
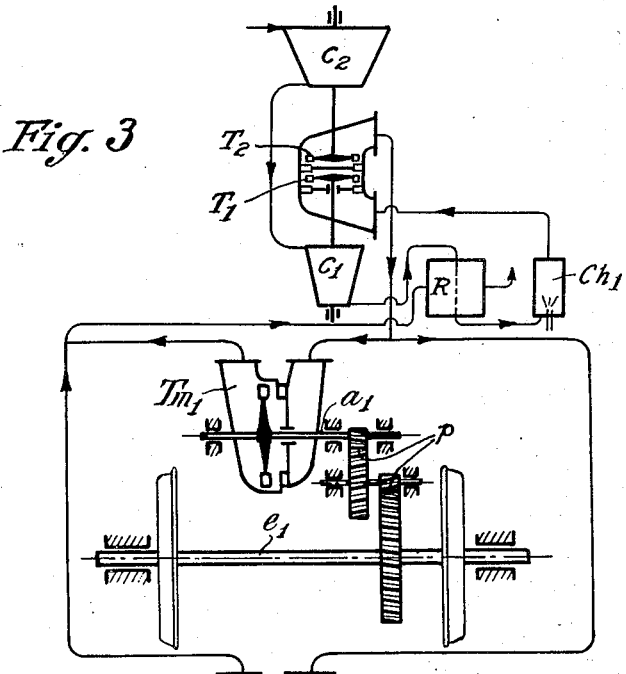
Figure 3 shows diagrammatically another embodiment of the invention.

In the driving apparatus illustrated in Fig. 1, the auxiliary group includes two different shafts driven by the two wheels of the turbine. The turbine wheel $T_1$ drives the compressor $C_1$ which provides all the air required for the operation of the auxiliary group. The air delivered by the compressor $C_1$ passes through the recuperator $R_1$ and then through the combustion chamber $Ch_1$. The gas produced feeds the turbines $T_1$ and $T_2$ and escapes into the atmosphere through the recuperator $R_1$.

The compressor $C_2$ driven by the turbine $T_2$ produces all the air required for the driving turbines $T_{m1}$ and $T_{m2}$. The air delivered by the compressor passes through the recuperator $R_2$ and the combustion chamber $Ch_2$. The gas produced feeds the driving turbines $T_{m1}$ and $T_{m2}$ and escapes into the atmosphere through the recuperator $R_2$.

The driving turbines $T_{m1}$ and $T_{m2}$ drive respectively the two driving shafts of the vehicle $e_1$ and $e_2$, through the agency of gearings P, the transmission ratio of which is suitably selected. The shafts $a_1$ and $a_2$ are arranged transversally with reference to the vehicle, i. e. parallel with the driving shafts, while the shafts of the group $T_1C_1T_2C_2$ are arranged parallel with the longitudinal axes of the vehicle.

The pressure for normal operation of the compressors $C_1$ and $C_2$ may be different.

This driving system shows the advantage that it is by no means necessary to adjust the equivalent opening of the turbines for keeping it at its optimum efficiency for all loads while any pumping of the compressors is avoided. The compressor $C_1$ is driven directly by the turbine $T_1$, and calculation shows that, without any special adjustment, it keeps at all loads at its optimum efficiency. On the other hand, the compressor $C_2$ is not connected mechanically with the turbines $T_m$ and it is necessary to satisfy the same condition, for the temperature of the gases at the outlet of the combustion chamber $Ch_2$ to remain in proper relationship with the speed of $C_2$, or with any other equivalent variable such as its delivery pressure or the power absorbed by it. The latter being connected with the operating rate of the auxiliary cycle including the turbine $T_1$, it is sufficient for satisfying the above mentioned condition that the introduction of fuel into the chamber $Ch_2$ remain in a certain relationship with the introduction of fuel into the chamber $Ch_1$. The relationship may be found by calculation or by experience for given characteristic data of the turbines and compressors forming the group.

The adjustment of the power produced may be performed by connecting the two burners with one another by means of mechanical means, comprising a suitably outlined cam, or by other mechanical, electrical, or hydraulic means, whereby the adjustment of one burner provides for the adjustment of the other under the desired relationship conditions. The transmission providing for this connection may be executed, by way of example, by a mechanical transmission including cams and an auxiliary motor, which is the simplest form of execution. Said transmission may also be executed by any other means mechanical, electric, hydraulic or a combination thereof. It may moreover be any desired type, controlled or not, compensated or the like. In Fig. 1 this connection, the execution of which involves no difficulty for one skilled in the art, is shown diagrammatically by the dotted line I.

Fig. 2 shows by way of example and by no means in a limitative sense a form of execution of such a connection. In said example, the two valved cocks $r_1$ and $r_2$ inserted respectively in the ducts feeding fuel to the two combustion chambers $Ch_1$ and $Ch_2$ are operated by means of a single control device. The rods carrying the valves inside the cocks are submitted to the action of springs shown respectively at $V_1$ and $V_2$ urging the corresponding valve into its open position while each spring is provided at its end with a roller shown at $g_1$ and $g_2$ and held by the corresponding spring against a suitably shaped cam $m_1$ or $m_2$. A single control rod $l$ carrying the two cams $m_1$ and $m_2$ may be operated, in accordance with requirements, by a lever L. It is always possible to ascertain, through calculation or through experimentation, the relationship which is to be provided in accordance with the load between the outputs of fuel feeding respectively to the combustion chambers $Ch_1$ and $Ch_2$ to provide for the proper designing of the outlines of the cams $m_1$ and $m_2$.

In the driving arrangement illustrated in Fig. 3 the driving turbines $Tm_1$, $Tm_2$, arranged as hereinabove described, and each driving a driving shaft, are connected in series with the auxiliary turbines $T_1T_2$. In this arrangement, the losses through residuary speeds at the outlets of both turbine bodies form a substantial portion of the entire drop when the latter is small. On the other hand, the temperature in the first wheel of the turbine $T_1$ being limited by mechanical considerations, the temperature ahead of the cycle will be higher and consequently the efficiency of the cycle will be higher when the drop inside the wheel is greater. It is of course limited by the peripheral speed required for the proper utilization of this fall. It is therefore desirable, for both reasons stated, to use for this cycle a pressure which is higher than in the case of the cycle illustrated in Fig. 1. The pressure should be for example of the order of 6 to 8 kgs./sq. cm. As the compressor may not consist of a single body, it is subdivided according to the invention into two bodies, each of which is controlled by one of the wheels of the turbines $T_1T_2$.

The adjustment of such a driving apparatus includes no adjustment of the equivalent opening of the driving turbines or of the auxiliary turbines. This adjustment is performed simply by acting on the introduction of fuel into the chamber $Ch_1$. Calculation shows that the two compressor bodies keep automatically very near their optimum efficiency at all loads.

Figure 4:
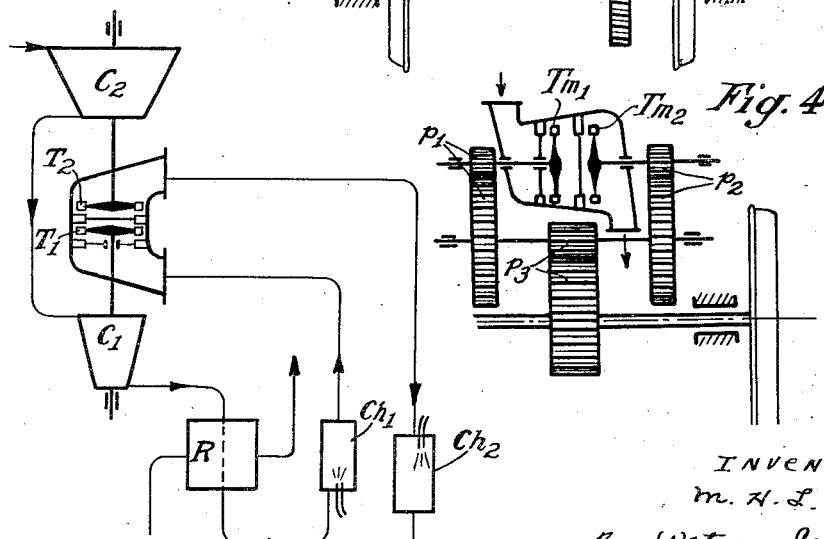
Figure 4 shows a modification of the arrangement of the driving turbines.

In the examples illustrated and described, the driving turbines $Tm_1$, $Tm_2$ may be of any suitable action or reaction type and in particular include two wheels arranged inside the same body and rotating in the same or opposite directions, as illustrated in Fig. 4. In Fig. 4, it has been supposed that the turbines $Tm_1$ and $Tm_2$ rotate in the same direction. They drive the wheels through the agency of speed reducing gears P1, P2, P3. If the turbines were to rotate in opposite directions, it would be sufficient to insert a further intermediary pinion or wheel.

Figure 3A:
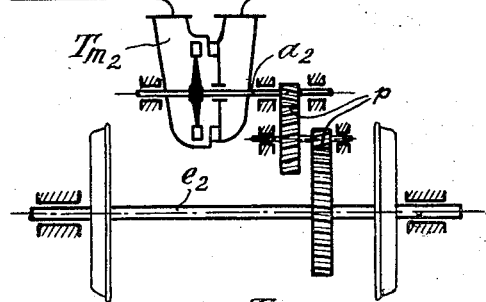
Figure 3a is a partial view of a modification.

According to a modification, it is possible to make use of the pipe system connecting the auxiliary turbines $T_1T_2$ with the driving turbines $Tm_1Tm_2$ for heating the gases through a chamber $Ch_2$ as shown in Fig. 3A, which thereby increases the efficiency of the cycle.

In this case, the introduction of fuel into this chamber should be in relationship with the introduction into the first chamber, as stated with reference to the first example, in order to keep the compressors and the whole cycle near optimum efficiency at all loads.

What I claim is:

1. A gas turbine installation for driving the wheels of a vehicle comprising an auxiliary turbine and a motive turbine operatively connected to the driving wheels of the vehicle, a first combustion chamber connected to feed its exhaust gases to said auxiliary turbine, a second combustion chamber connected to feed its exhaust gases to said motive turbine, two compressors, said auxiliary turbine having two turbine wheels each supported for rotation independently of the other, separate drive shafts connected to and driven by each of said turbine wheels, respectively, each of said two compressors being drivenly connected to one of said shafts, whereby each of said compressors is driven independently of the other said compressor by said auxiliary turbine, each of said compressors being connected to deliver its output to one of said combustion chambers, and means for introducing fuel into each of said combustion chambers at a predetermined fixed ratio.

2. A gas turbine installation as described in claim 1, wherein the means for introducing fuel into each of said combustion chambers comprise valving devices, means for regulating the setting of said valving devices, and linkage connecting both said regulating means, whereby increased fuel delivery to said second combustion chamber will cause a correlated increase to the said first combustion chamber.

3. A gas turbine installation for driving the wheels of a vehicle comprising two separate hot gas lines each including in series: an air compressor having an intake for atmospheric air and means for delivering air under pressure to its respective gas line independently of the other, a combustion chamber fed by said line, a fuel feeding device for said combustion chamber, and a gas turbine receiving combustion gases from the said combustion chamber; one of said turbines being drivingly connected to the driving wheels of the vehicle, the other of said gas turbines comprising two mechanically independently turbine wheels arranged seriatim, each of said turbine wheels being mechanically connected, respectively, to one of said compressors to drive said compressor, and the said fuel feeding devices of both said combustion chambers being connected to each other in order to feed fuel to said chambers at a predetermined ratio.

MARCEL HENRI LOUIS SÉDILLE.

REFERENCES CITED

The following references are of record in the file of this patent:

UNITED STATES PATENTS

| Number | Name | Date |
|---|---|---|
| 1,043,480 | Sundh | Nov. 5, 1912 |
| 1,521,000 | Boltshauser | Dec. 30, 1924 |
| 1,932,698 | Jose | Oct. 31, 1933 |
| 2,098,074 | Warren | Nov. 2, 1937 |
| 2,238,905 | Lysholm | Apr. 22, 1941 |
| 2,280,765 | Anxionnaz | Apr. 21, 1942 |
| 2,407,165 | Kreitner | Sept. 3, 1946 |

FOREIGN PATENTS

| Number | Country | Date |
|---|---|---|
| 218,724 | Switzerland | Apr. 1, 1942 |
| 367,130 | Great Britain | Feb. 18, 1932 |
| 378,660 | Italy | Feb. 20, 1940 |
| 384,778 | Germany | Nov. 9, 1923 |